Figure 1:
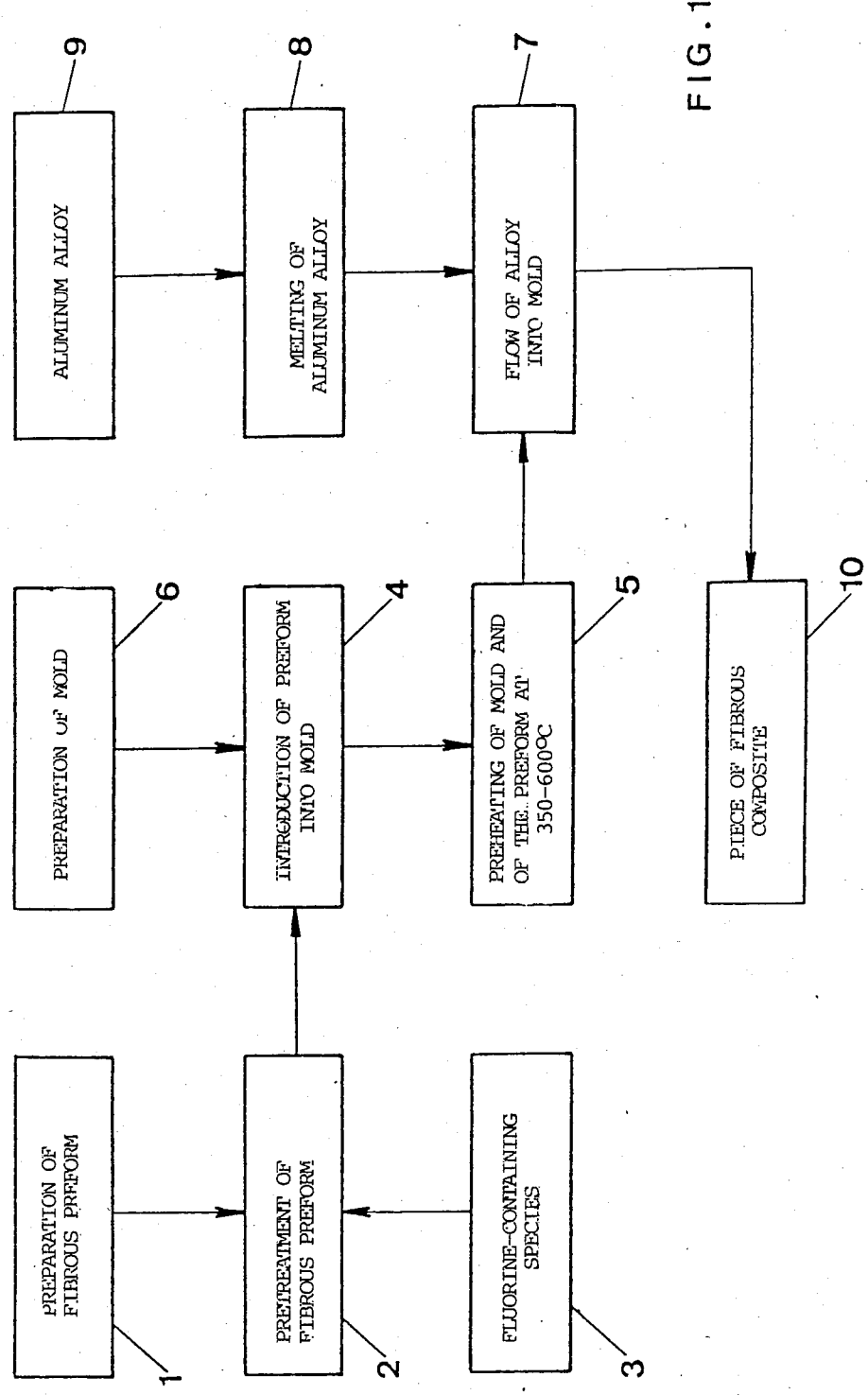

United States Patent [19]

Rocher et al.

[11] Patent Number: 4,659,593
[45] Date of Patent: Apr. 21, 1987

[54] PROCESS FOR MAKING COMPOSITE MATERIALS CONSISTING OF A FIRST REINFORCING COMPONENT COMBINED WITH A SECOND COMPONENT CONSISTING OF A LIGHT ALLOY AND PRODUCTS OBTAINED BY THIS PROCESS

[75] Inventors: Jean-Philippe Rocher, Chalais; Jean-Michel Quenisset, Pessac; Rene Pailler, Cestas; Roger Naslain, Pessac, all of France

[73] Assignee: Messier Fonderie d'Arudy, Arudy, France

[21] Appl. No.: 567,403
[22] PCT Filed: Apr. 14, 1983
[86] PCT No.: PCT/FR83/00068
    § 371 Date: Dec. 19, 1983
    § 102(e) Date: Dec. 19, 1983
[87] PCT Pub. No.: WO83/03625
    PCT Pub. Date: Oct. 27, 1983

[30] Foreign Application Priority Data

Apr. 15, 1982 [FR] France .................. 82 06448
Sep. 17, 1982 [FR] France .................. 82 15689

[51] Int. Cl.⁴ ............................................. B22D 19/14
[52] U.S. Cl. ........................... 427/310; 29/527.5; 164/97; 427/404; 427/443.2; 427/190; 427/202; 427/203
[58] Field of Search ............ 427/304, 310, 404, 443.2, 427/190, 202, 203; 428/408; 75/257; 106/313; 164/97; 29/527.5

[56] References Cited

U.S. PATENT DOCUMENTS 4,157,409  6/1979  Levitt et al. ............... 427/299
4,158,710  6/1979  Gierek et al. .............. 427/310

Primary Examiner—John D. Smith
Attorney, Agent, or Firm—McAulay, Fields, Fisher, Goldstein & Nissen

[57] ABSTRACT

The present invention concerns processes for making composite materials.

The process is characterized essentially by the fact that it consists in making a fibrous preform 1, in pre-treating this fibrous preform by a fluorine containing flux 3 and in wetting the said pre-treated preform by a light alloy.

Utilization for the making of composite pieces with a fibrous armature such as carbon wet by a light aluminum-based alloy.

21 Claims, 4 Drawing Figures

PROCESS FOR MAKING COMPOSITE MATERIALS CONSISTING OF A FIRST REINFORCING COMPONENT COMBINED WITH A SECOND COMPONENT CONSISTING OF A LIGHT ALLOY AND PRODUCTS OBTAINED BY THIS PROCESS

The present invention is concerned with processes for making composite materials and more particularly, composite materials comprising a first fibrous component forming the frame of the composite material and a second component consisting of a light alloy acting as a matrix and in the liquid state wetting the first component after pre-treatment of said first component by a fluorine containing agent in order to obtain a composite material having all the qualities inherent to this type of material. Reinforcement of light alloys by fibers having high mechanical characteristics has not heretofore had a development comparable to that of plastic materials, mainly because of technical difficulties encountered during processing.

However, composites containing a metallic matrix have certain interesting specific characteristics: ability to use with heat, resistance to fatigue; lack of aging, stability relative to various media, high thermal and electrical conductivities, reproducibility of characteristics, etc.

Among these materials, composites having an aluminum matrix reinforced by fibers such as carbon based fibers (carbon, silicon carbide) are particularly interesting because on the one hand of their mechanical characteristics, availability, the ability to weave them and the relatively moderate prices of this type of fibers and on the other hand because of the low density, low melting point and the low cost of aluminum alloys. The development of this type of composite is actually considerably delayed by the fact that their simplest production process, liquid phase impregnation, is complicated by the poor wettability of these fibers by most aluminum alloys in the liquid state as well as by the occurrence of chemical reactions between the fiber and the matrix tending to lessen the reinforcing power of the fibers.

It is known, as a matter of fact, that graphite (as well as most of the other forms of carbon) is not spontaneously wet by liquid aluminum (and most of its usual alloys, mainly foundary alloys) at temperatures below 100° C. As a result liquid aluminum cannot spread on a graphite surface or penetrate by capillary action within its pores, some of which are very small, in the strands of carbon, fibers or in multidirectional porous preform shapes made therefrom. At the temperatures where aluminum wets graphite (0>1000° C.) there occurs a very rapid chemical reaction accompanied by precipitation of aluminum carbide and causing an irreversible mechanical damage to the fibers. It is to be noted also that graphite and aluminum react together but more slowly at much lower temperatures (beginning at 550° C.), the formation of $Al_4C_3$ leading to a poor adhesion between the fiber and the matrix (and therefore to a tendency to delaminate and to poor transverse properties) and to weakening of the matrix.

Silicon carbon based fibers, such as for example NICALON, commercialized by the Japanese company and formed of a mixture of silicon carbide, carbon, and silica, though they have a better chemical compatibility with metals than those of pure carbon, are also poorly wet by liquid aluminum and most of its usual alloys).

In an attempt to avoid these problems, a considerable research effort has been devoted to the making by liquid means of fibrous composites having an aluminum based matrix. It should be distinguished first between the case of fibers having a large diameter such as boron filaments (coated or uncoated) or silicon carbide whose diameter is generally comprised between one and two hundred microns and which are obtained by deposition in vapor phase on a filamentary substrate of tungsten or carbon. The preforms made with the aid of these products, which have of necessity a very simple shape owing to the rigidity of these filaments, are characterized by very large pores which readily allow penetration by liquid aluminum using if necessary a slight pressure (impregnation by liquid or even semi-liquid means). These filaments because of their morphology and their mechanical characteristics are indicated for making elongated or flat composite products but are not suited for making pieces of reinforced aluminum which have complex shapes such as those which are found habitually in the field of casting light alloys. Finally, in the present state of the art, these filaments are very expensive products subject to difficulty in supplying. Although it can be used for all association between a light alloy, in particular of aluminum and materials having a carbon or carbide based surface, for example for reinforcements formed of the previously mentioned large diameter filaments, the process of the present invention preferably is applicable to the liquid phase impregnation of fibrous reinforcements formed of fibers having a small diameter (in general from 7 to 20 microns) such as carbon or silicon carbide based fibers (or even of carbide coated alumina) used in the form of strands containing several hundreds or even several thousands of elementary filaments. In these strands or in the mono or multidirectional preform shapes used from these strands, the pores are extremely small, often of the order of only a few micrometers so that consequently aluminum penetrates therein very easily. Because of their flexible nature (in the form of felts cloth or multi-directional shape) of their availability and of their relatively moderate cost these are the fibers which will be used preferentially to form fibrous reinforcements for reinforced light alloys, in particular pieces of complex shape made by casting techniques.

As it has been mentioned above, aluminum (or most of its common alloys) does not spontaneously impregnate under usual operating conditions, complex fibrous preforms or even a simple multifilament strand when these are formed of fibers having a small diameter(in particular silicon carbide or carbon based fibers). In order to enhance the wetting of these by liquid aluminum, a pre-treatment of the fibers (or the addition to the matrix of specific alloying elements) is indispensible. Despite the research effort that has been devoted to this task during the last twenty years, the solutions which have been proposed are either difficult to carry out or limited to products having an extremely simple shape (wires, thin sheets).

Thus, it has been proposed to pre-treat carbon fibers by immersing them in an alkali metal bath (sodium or sodium potassium alloy), then of tin (containing 2 percent of magnesium). In a modification the pre-treatment can be effected in gaseous phase. Thus pre-treated, the fibrous reinforcement the surface of whose fibers would have acquired a metallic character by insertion of alkali is spontaneously wet by liquid aluminum around 700° to 800° C. This process however has the convenience of requiring products which are delicate to manipulate and must be carried out completely under an inert atmosphere (argon for example). Moreover its usefulness appears to have been limited up to now to the production on a laboratory scale of small composite carbon aluminum wires.

It has also been suggested to deposit on the surface of carbon fibers a thin film of an alloy or a specific titanium compound by vapor phase chemical deposition (CVD). Such is the case of processes depending on a deposition of titanium carbide or better still of a titanium boron alloy, whose composition is not known with precision but which might be one of the two titanium borides TiB and TiB$_2$. This alloy is formed on the surface of the fibers by coreduction, in gaseous phase, of BCl$_3$ and of TiCl$_4$ by zinc vapor at a temperature of 600° to 700° C. Thus pre-treated a strand of carbon fibers is spontaneously wet by liquid aluminum (for example alloy Al-201) as long as it has not been placed in contact with air between the operations of pre-treatment and impregnation. Even there, the process must therefore be completely carried out under a controlled atmosphere (dry argon). Besides, to our knowledge the process has been limited to the fabrication of extremely simple shapes (threads, sheets). This technique, while it has the advantage of effectively improving wetting of carbon fibers by aluminum and of forming on their surface a barrier protecting them against excessive attack by the matrix, it inconveniently requires another sensitive technique (CVD starting with corrosive fluids, operating under argon) hardly compatible with the casting of light alloys.

In the same order of ideas, it has been suggested to cover the surface of carbon fibers with a film of a metal such as nickel, copper, silver or tantalum. The metal deposit is made either by CVD or by electrolysis. This process has two drawbacks. The high density of the metals recommended leads to a considerable increase in that of the corresponding composites, even if the coating is thin, in particular when the volume fraction of the fibers is considerable. Besides, there forms most often intermetallic compounds between aluminum and the metal of the coating which weaken the matrix. Finally, to the extent where the coating dissolves in the matrix during impregnation, the fibers no longer are later protected against chemical attack by the matrix. Among these procedures should be cited a particularly simple technique which consists in impregnating the fibers with a colloidal suspension of a metal such as silver. This technique possesses the advantage of producing a very thin coating which remain active in air. However to be complete, subsequent impregnation with liquid aluminum requires relatively high pressures (use of a press) hardly compatible in the present state of the art, with the casting of light alloys. More specifically, the present invention has for its object a process for making composite materials comprising a first reinforcing component in the form of continuous or discontinuous fibrous particles, multistranded cores or in the form of plates or of uni-or multi-directional preforms, associated with a second component constituted by a light alloy serving as a matrix, characterized by the fact that it consists, in a first step, in pre-treating the said first carbon or carbides-based reinforcing component (for example, silicon carbide) in the form of a continuous or discontinuous fibers, multifilamentary cores or in the form of plates or fibrous uni- or multi-directional preforms, by one or more fluorine-containing species in solid form or in solution (or suspension) in a liquid, such as for example, a fluorotitanate, fluorozirconate, fluorohafnate, fluorovanadate, fluoroniobate, fluorotantalate, fluoroborate, fluoroaluminate or fluorosilicate of electropositive elements such as the alkali metals, alkaline earth metals or rare earth metals and in impregnating the said, pre-treated preform by a liquid aluminum based alloy.

As will be appreciated by one skilled in the art, the process of the invention differs essentially from processes previously suggested and has several advantages relative thereto. The operation of the process is, in particular, perfectly compatible with the techniques of casting light alloys which was not the case with previous techniques as indicated above. Moreover, pre-treating of the fibrous reinforcement by one or by several fluorine-containing species can be done in air, the said pre-treated reinforcement retaining a good ability to be wetted by light alloys even if kept in air during a relatively long time between pre-treatment and impregnation. The pre-treatment operation itself does not require any delicate manipulations which limited the use of prior processes (immersion in alkali metals in liquid or vapor state, vapor phase deposition with corrosive products or igneous electrolysis) since it simply consists in treating the core or fibrous preform by the, or the, several, fluorine-containing species, in solid form or in solution (or suspension) in a liquid, in air and at a temperature which depends on the nature of the or the several fluorine-containing species and on the form in which these species are used but which remains sufficiently low so that it does not appreciably alter the fibers before impregnating the thus treated fibrous reinforcement with the liquid aluminum alloy.

Two fluorine-containing fluxes already have been suggested in the casting of light alloys, particularly, to refine the grain. However, the process according to the invention differs from this type of operation to the extent where the, or the several, fluorine-containing species used to improve wetting of carbon or carbide-based fibers (silicon carbide, for example by aluminum, must be used to pre-treat the fibers, before impregnation by liquid metal and under very specific conditions and not simply be added to the metal before casting.

While most previous processes were only applicable to the making of threads, ribbons, or composite sheets, the process of the invention makes possible not only a simpler fabrication of these products, but, more importantly, it can be applied directly to the making of massive pieces with a fibrous reinforcement. Owing to this fact, it constitutes a true process for casting reinforced light alloys of carbon fibers. This, it has successfully been applied to the fabrication of pieces comprising various kinds of fibrous armatures among which can be mentioned: bulk short fibers of carbon or carbides (silicon carbide, for example), dry felts or consolidated with a small amount of carbon (pyrocarbon, resin or pitch core) or of carbide, cores, mats, fabrics stacked in parallel fashion on one another and, optionally, consolidated by carbon a carbide; and finally, multi-directional structures. In every case, the fibrous reinforcements thus treated by the process employing fluorine-containing species, according to the invention, could be impregnated under satisfactory conditions.

Various types of fluorine-containing species are useful for pre-treating the fibers. This is the case, in particular, of double or complex fluorides comprising at least one transition element (such as titanium, zirconium, hafnium, vanadium, niobium or tantalum, for example, $K_2TiF_6$ and $K_2ZrF_6$ or even aluminum combined with an electropositive element (such as the alkali, alkaline earth, or, rare earth metal). These fluorine-containing combinations can be used singly or in mixtures thereof or still be associated with halides (simple fluoride, for example) of alkali, alkaline earth and rare metals so as to modify the physical properties of the mixture (formation of eutectics, for example) or to influence the chemical reactions occurring during pre-treatment of the fibrous reinforcement or the eventual addition of simple or complex fluorides of aluminum, itself. Among possible composites which have shown particular activity are those based on $K_2TiF_6$ or $K_2ZrF_6$, alone or mixed with $KBF_4$. The process of the invention, while it was specifically devised to impregnate reinforcements made from carbon or carbides (SiC, for example) -based fibers, can be applied to other fibers (based on oxides such as alumina, for example, optionally coated with carbon or carbides) usable for reinforcing light alloys.

Figure 2:
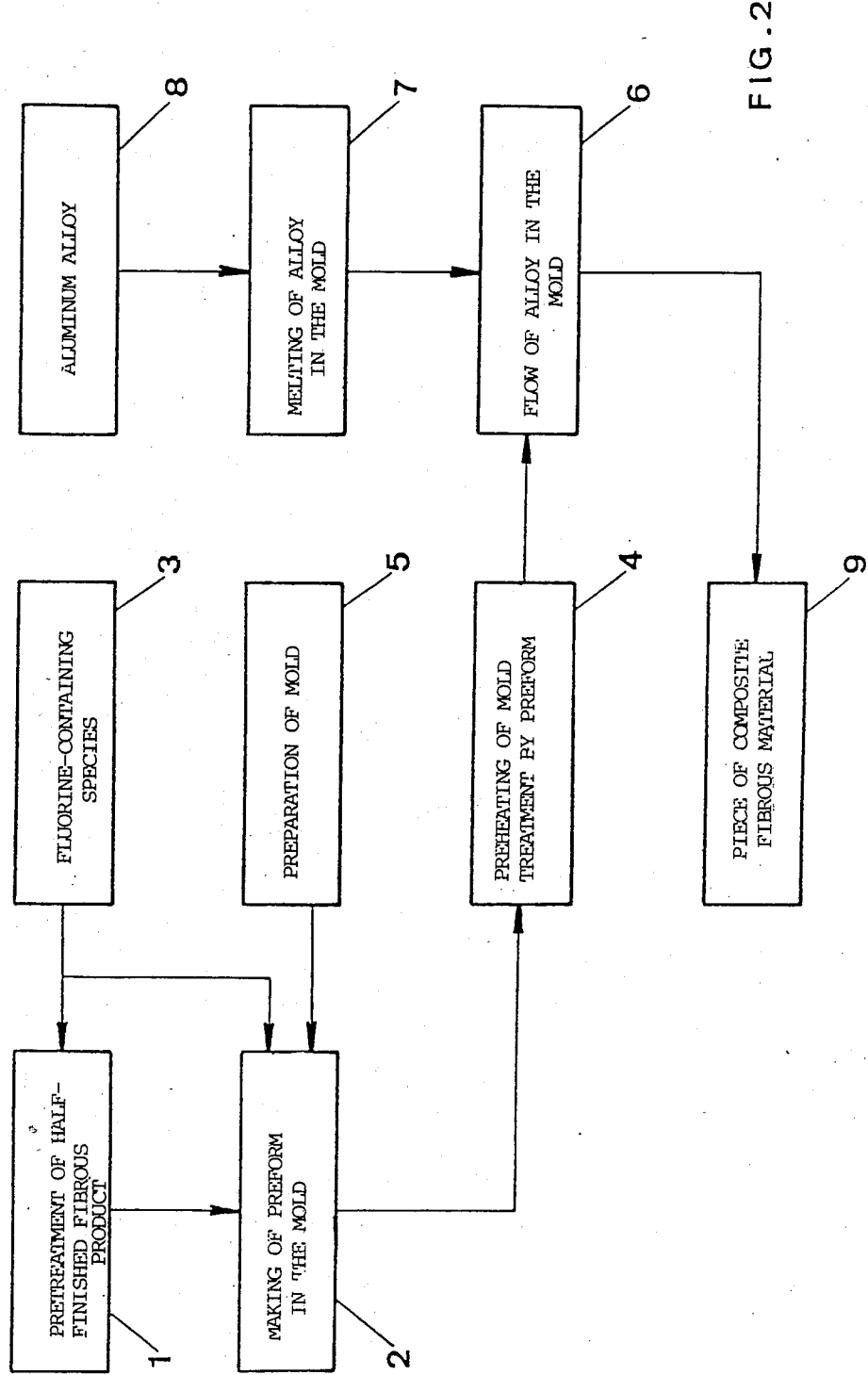

The invention will now be described with reference to FIGS. 1 and 2 showing schematically the arious steps in two embodiments of the invention, of the process for making cast shapes of reinforced light alloy depending on whether the fibrous armature is made outside the mold (FIG. 1) or within the mold starting with semi-finished products (FIG. 2) and with reference to FIGS. 3 and 4 in the case of continuous operation of the pre-treating and-impregnation steps to form composite threads or ribbons. Additionally, the process will be illustrated by several examples as will be evident to one skilled in the art.

Referring to FIG. 1, a fibrous preform 1 is made in order to reinforce all or a part of the shape to be fabricated using production methods for fibrous materials of high mechanical performance, starting with the fibers themselves, or, better still, with half-finished fibrous products (felts, mats, fabrics, multidirectional fibrous constructions or bars). It can be dry or consolidated, for example, with a small amount of carbon (pyrocarbon resulting from the pyrolysis of a gaseous hydrocarbon or of a coke resulting from that of an organic resin or of a pitch) or of carbide (silicon carbide resulting from the pyrolysis of a silicon-containing compound such as methyltrichlorosilane or of a silicon-containing organic resin). Depending upon the intended use, the fibrous preform can extend for the entire volume of the mold or may correspond only to a part thereof (local reinforcement or ceramic insert for example). In order that it be easily impregnated by liquid aluminum, the fibrous preform must have an open porosity which is relatively considerable. In the case of a ceramic-ceramic insert, in particular of a fibrous ceramic-ceramic insert, the insert must also have a considerable porosity at the level of the faces in contact with the matrix in order to insure good fixation by penetration of the metal in the said porosity.

The preform thus made is thereafter pre-treated 2 with the aid of fluorine-containing species 3 before introduction in a prepared mold 6. This operation which technically constitutes the essential step of the process of the invention can be effected in various ways according as to whether the pre-treatment of the fibrous treatment with fluorine-containing species is effected in the solid state or in solution (or in a suspension). Thus fluorine-containing species can be used in the form of a powder having a very fine granulometary which is uniformly dispersed on the surface of the fibrous preform. In this case the preform must be pre-heated to a temperature depending on the chemical composition of the fluorine-containing product and of the nature of the fibers (carbon oxidizes from 400° to 500° C. while SiC can be heated in air to a very high temperature), in such a way that the latter forms a uniform crust around the preform.

The fluorine-containing species can equally be dissolved (or suspended according to their solubility in usual solvents) in a suitable liquid which necessarily must wet well the fibers to pre-treat. A fugitive organic binder can be added to the solvent in order to temporarily secure the fluorine containing species in contact with the fibers. Under these conditions, the preform is pre-impregnated at a temperature which depends on the solubility of the particular fluorine containing species and of the quantity of active product necessary for the pretreatment by said solution (or suspension), the excess of solvents being physically removed. This method of carrying out the pretreatment has the advantage over the previous one of distributing more uniformly the active fluorine-containing species within the preform and to limit the quantity of reactants to the amount exactly necessary to later obtain good wetting by the liquid metallic alloy. The pre-treatment of the fibrous preform by the fluorine-containing reactants can be carried out under an inert atmosphere or, more simply, in air. After pre-treatment the fibrous preform placed in a mold 4 of the type used in the melting of light alloys (metallic shell optionally coated on its inner surface with a protective layer) is impregnated 7 by liquid metal 8. The nature of metal 9 depends on the use which will be made of the finished products (thermal treatment for structural hardening, for example). The cast light alloys having good melting properties such as the aluminum and silicon based alloys AS7G, for example are very easy to use.

Referring now to FIG. 2, the making of the preform can be effected with the aid of semi-finished fibrous products (cloth, mats, for example) directly in the mold. In this case the semi-finished fibrous products are first pre-treated 1 by the fluorine containing reagent 3 outside the mold, for example by immersion in a solution (or suspension) of the fluorine containing reagent then dried. They are thereafter draped against the walls of the mold (entirely or only in the parts of the piece which must be reinforced) then layer upon layer and a new addition of fluorine-containing reagent is eventually made in order to insure that the entire fibrous reinforcement has been well coated with fluorine-containing reagent. The mold is then closed and pre-heated 4, this pre-heating eliminating the excess of solvent (and eventually the fugitive binder).

Referring to the two FIGS. 1 and 2, the casting can be advantageously effected in a mold previously placed under vacuum, the metal being later introduced under a slight excess of pressure to promote its movement within the fibrous preform. In the same way the impregnation is improved if the mold and the preform have been pre-heated. The pre-heating temperature depends upon the nature of the shape to be made and that of the fibers. If casting is effected in air, the pre-heating temperature will be limited to 350° to 400° C. in the case of a preform based on carbon fibers carbon oxidizing in air at a higher temperature). The melting is effected under an inert atmosphere if the nature of the shape requires a hotter pre-heating. There is however no limitation of temperature in the case of silicon carbide based preforms.

The process as just described can be extended to making continuously half finished composites comprising a carbon or carbide (silicon carbide for example) based fibrous reinforcement and a matrix of light alloy in the shape of wires, ribbons or profiled shapes. Referring now to FIGS. 3 and 4, the first component constituted by a carefully cleaned fibrous reinforcement in the form of one or several strands, of a ribbon (woven or not) or a strip of cloth made of carbon or carbide (for example silicon carbide) -based fibers is wound on a delivery bobbin 1. It is delivered under a slight mechanical tension toward a pre-treatment treatment vat containing a solution (or suspension) of a fluorine-containing agent in a suitable solvent (water, for example, optionally containing a small quantity of a fugitive binder). By way of example, the pre-treatment can be advantageously effected with an aqueous saturated, or nearly saturated solution of $K_2ZrF_6$ as the active species. This pre-treatment can be effected under an inert atmosphere or more simply in air (2,3 FIG. 3 and 2 FIG. 4).

Figure 3:
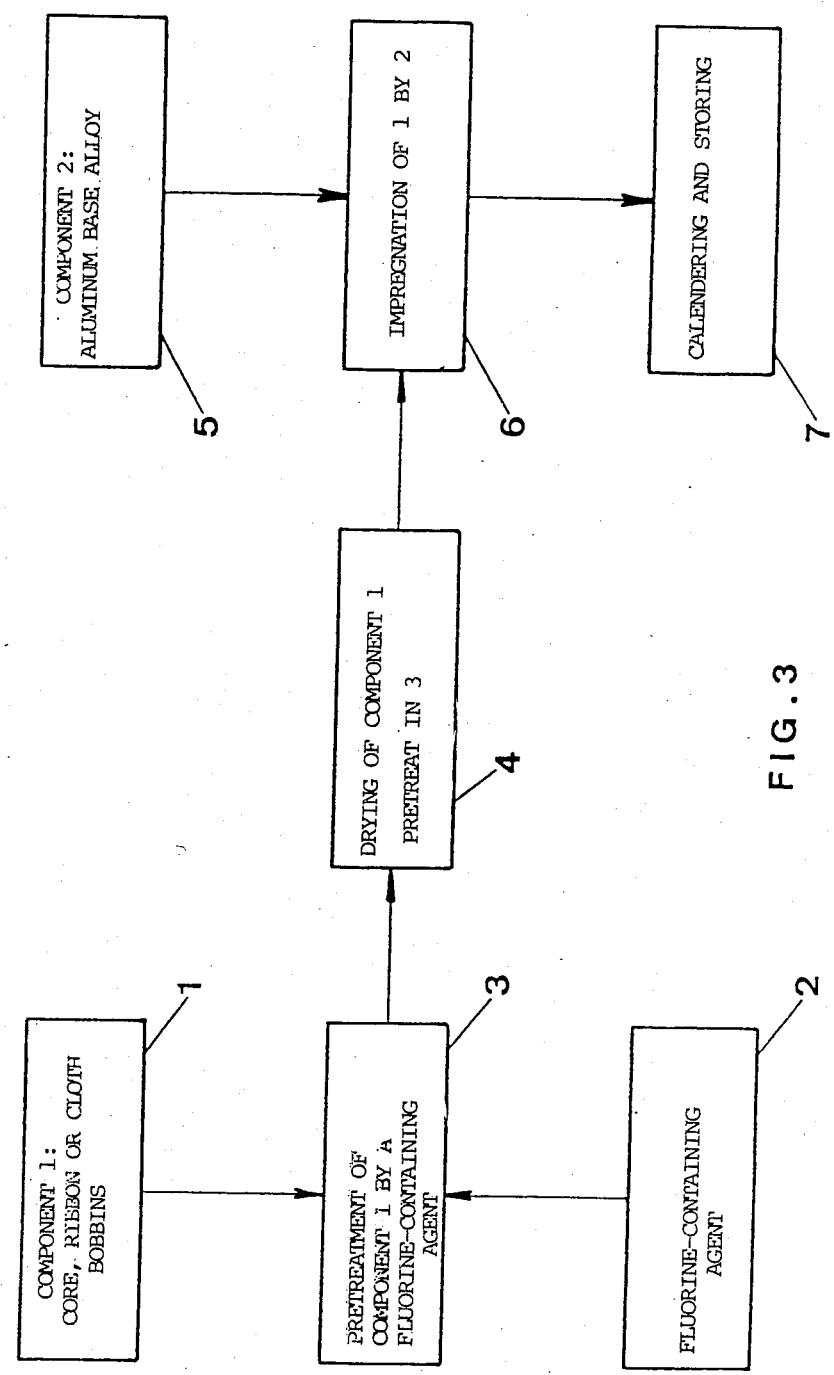
Figure 4:
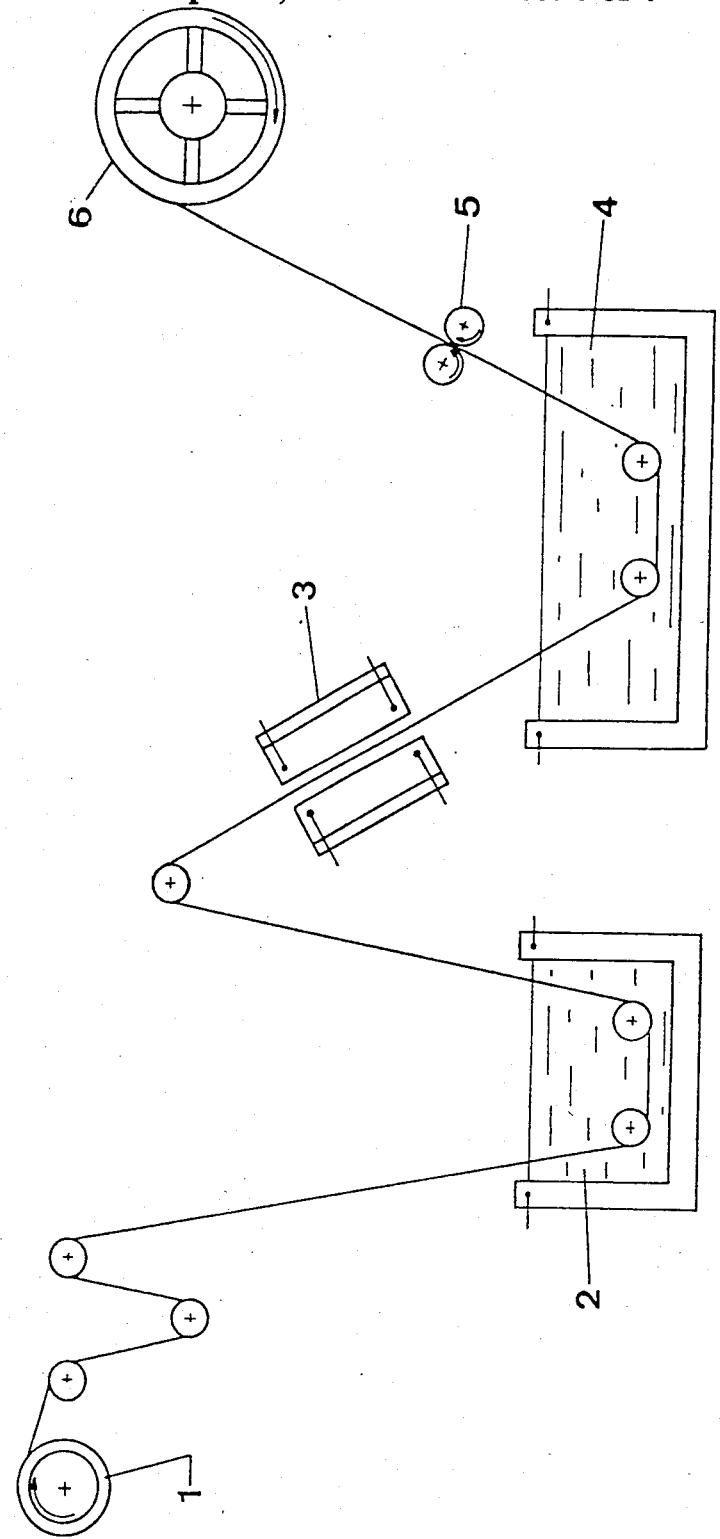

After impregnation by the solution (or suspension) of fluorine-containing agent, this fibrous reinforcement passes into a drying oven (3 FIG. 4) where excess liquid is eliminated (4 FIG. 3). During this operation the fluorine containing agent deposits as a fine layer of solid particles on the inner wall of the pores and of the interstices of the fibrous reinforcement. The component 1, thus pre-treated, is then continously directed toward a vat (4, FIG. 4) containing the component 2 in the form of a liquid aluminum alloy (5, FIG. 3) maintained at a temperature of about 750° C. which it traverses and where is effected the final impregnation (6, FIG. 3). The composite thus made is immediately directed towards a calendering device (roll or extruder) (5, FIG. 4), in order to eliminate excess metal which might have been entrained and to give it its final shape (7, FIG. 3). After this operation, the product is either wound on a receiving bobbin of large diameter (in the case of small diameter wires and of ribbons or thin sheets) (6, FIG. 4), or sent on (in the case of thicker semi-finished products). When the fibrous reinforcement has been correctly cleaned and then properly pre-treated by the solution (or suspension) of fluorine containing agent and finally dried, the liquid alloy, during the impregnation step, ascends very rapidly by capillarity into the pores and interstices. The speed of passage of the fibrous reinforcement must be adjusted in such a way that the three principal operations (pre-treatment by fluorine containing agent, drying and impregnation by alloy) be completed.

The half finished products thus obtained can serve for the later formation of profiled shapes of various cross-sections, of panels, by metallurgical processes based on hot plastic deformation known to those skilled in the art.

The invention will now be illustrated by several examples without these in any way limiting the scope of the invention as will be apparent to one skilled in the art:

EXAMPLE 1

A parallelipipedal preformed fibrous shape with a square base of 10×10×50 mm on its sides was felt of carbon fibers (diameter of about 7 microns, precursor polyacrylonitrite) in which the volume fraction of fibers was of the order of 20 percent. Each surface of the preform received a fine layer of a powder consisting of potassium fluotitanate $K_2TiF_6$, and then the preform was heated to a temperature of about 700° C. Under these conditions the fluorine containing product forms, without reaching melting (in the opposite instance, $K_2TiF_6$ would be partially decomposed), a uniform layer around the preform which is rather resistant. After cooling, the preform was placed in a mold consisting of a steel shell (interior dimensions: diameter equal 16 mm; height equal 60 mm). The mold and the fibrous preform were pre-heated to 400°/500° C., then casting effected with the aid of a AS7G alloy. At the moment when the liquid metal came into contact with the crust of fluorine-containing product surrounding the preform, there was noted an exothermic reaction probably connected with the reduction of $K_2TiF_6$ by aluminum and to various other secondary reactions.

After cooling, the piece was sectioned perpendicularly to its axis and examined with a metallographic microscope and with a sweeping electron microscope. It appeared that under the conditions of the test, the liquid metal, following the pre-treatment with the fluorine-containing producr and the exothermic reaction with aluminum, had spontaneously wetted the fibers of the preform and penetrated into the open pores thereof. Study of the distribution of the various elements, near the interstices of the fiber matrix (elements contained in fluorine-containing product), principally by microanalysis X and Auger did not detect a substantial accumulation of potassium, of titanium or of fluorine which could have been deleterious. It is therefore likely that at least a part of the initial fluorine containing species formed during reaction with aluminum, vaporized at the moment of impregnation with the liquid metal. There was noted, however, the presence of traces of potassium and titanium near the immediate vicinity of the fiber matrix interfaces as well as a certain residual porosity (pores incompietely filled).

By way of comparison, the same tests made on a preform which was not treated with the fluorine containing agent failed (no penetration of liquid metal into the fibrous preform).

EXAMPLE 2

The operation described in Example 1 was repeated, but the pre-treatment of the fibrous preform was made with the aid of a fluorine-containing mixture containing 50 percent of $K_2TiF_6$ and 50 percent of $KBF_4$ (by weight) to a temperature (about 500° C.) substantially lower to that required by pre-treatment with $K_2TiF_6$ alone.

It was again observed that at the moment when the liquid metal arrived in contact with the crust of the fluorine containing products, an exothermic reaction occurred and the liquid metal wetted the fibers and penetrated into the open pores of the fibrous preform. A certain residual porosity was again noted.

Thus the addition of a fluoborate, or fluotitanate, although it is not indispensible, as shown by Example 1, makes it possible to significantly lower the pre-treatment temperature of the fibers and to reduce possible damage to them.

EXAMPLE 3

A fibrous preform in the shape of a cylinder 35 mm in diameter and 50 mm high was made with a multidirectin construction or "4D" of bars of carbon fibers commercialized by the Societe Europeenne de Propulsion. In this construction, the bars of carbon fibers had a diameter of 1 mm and were oriented along the four main diagonals of the cube, the open porosity of the preform being of about 60 percent.

A saturated aqueous solution of $K_2ZrF_6$ was made by dissolving to 80° to 100° C. an excess of this salt in water. The fibrous preform was plunged in air into the solution which wets well bars of carbon fibers. After drying in an oven, there was observed that a fine and uniform layer of fluorine-containing product covered the bars on the side of the external surface of the preform as well as on the level of its pores. The preform thus treated was impregnated in a shell with the aid of a liquid AS7G alloy, as described in Example 1.

As before there was observed an exothermic reaction but of a reduced intensity owing to the reduced amount of fluorine containing product involved at the moment when the liquid metal came into contact with the fluorine containing product, accompanied by complete penetration of liquid in all the interstices of the multidirectional preform 4D. No substantial accumulation of fluorine-containing products remained in the multidirectional after impregnation. Moreover, no alteration of bars was noted. It was possible thus to prepare directly in air a multidirectional composite 4 of carbon aluminum of massive shape containing about 40 percent by volume of fibers (in the form of bars 1 mm in diameter).

This example shows that the process according to this invention makes it possible to obtain vary simply relatively massive shapes of composite carbon aluminum fibers characterized by high volume fractions of carbon fibers. It emphasizes, besides, the advantage that presents the carrying out in liquid phase of the impregnation of the preform by the fluorine containing agent. To this effect, the use of $K_2ZrF_6$ is particularly indicated, bearing in mind the high solubility of this double fluoride in water. The main advantage of this type of pre-treatment resides in the fact that the impregnation of preform with the aid of a solution, makes it possible to ve uniformly disperse the fluorine containing agent in all the porosity of the preform while avoiding the need to use an excess. Finally it will appear to one skilled in the art that rhe nature of the reagents, and in particular the mode of operation recommended, differentiates very clearly the process according to rhe invention from those previously developed to refine aluminum alloys by means of fluorine containing fluxes or for the pre-treatment of carbon strands in order to impregnate them with aluminum alloys.

EXAMPLE 4

A fibrous preform similar in size to that considered in Example 1 was made from a felt of carbon fibers which had previously received a treatment CVD so that each carbon fibers had a coating of about 1 ym of silicon carbide. Then the preform was pre-treated in the solid state with a mixture of 50 $K_2TiF_6$–50 $KBF_4$ (by weight) and impregnated with a liquid AS7G alloy as indicated in Example 2. Analysis showed that the preform was impregnated without excessive residual porosity and without substantial accumulation of fluorine-containing agent.

A comparative test made with rhe same preform, but without pre-treatment with the fluorine containing mixture failed (little or no penetration of meral into the fibrous preform).

This example illustrates the fact that the process according to the invention can be used with fibers other than carbon fibers.

EXAMPLE 5

A fibrous preform in the shape of a parallelipiped (26×50×50 mm) was used starting with silicon carbide based fibrous cloth (fibers of the NICALON type having ten to twelve ym in diameter, and commercialized by the company Nippon Carbon). The volume fraction of the fibers therein was of about 20 percent.

An aqueous solution of $K_2ZrF_6$ was prepared by dissolving this salt in water (at the rate of 20 grams of $K_2ZrF_6$ in 100 ml of solvent) at a temperature sufficient to prevent the presence of a solid residue. The fibrous preform was plunged, in air, in this solution which wets well this type of fibers and ascends by capillarity into all the interstices of the preform. After drying at 110° to 120° C., it was observed that a fine and uniform layer of fluorine containing product covered the fibers. The preform thus pre-treated was placed in a steel shell (comprising a protective layer) of the type commonly used for casting light alloys. The shell and the preform were pre-heated to about 550° C. and then casting was effected in air and at about 750° C. with a AS7G06 alloy.

After analysis, it appeared that under the conditions of the test, the aluminum alloy had perfectly wetted the fibers and penetrated, by capillary ascent, in all the interstices of the preform, leading to a composite containing by volume about 20 percent of fibers and about 80 percent of matrix.

The same test was then carried out without giving to the fibrous preform a pre-treatment with potassium fluzirconate. The test failed, practically no alloy having penetrated within the fibrous perform.

These two tests therefore show that a pre-treatment, by a process such as that of the invention, is indispensable in order to prepare, by usual casting techniques and starting with a porous fibrous preform, a massive composite constituted by a silicon carbide base fibrous reinforcement and an aluminum alloy at least when the fibers are of very small diameter and when their volume fraction within the material is relatively high. Thus the process of the invention differs from that described by S. Yajima which has recourse to a liquid phase impregnation under high pressure (a press with heated platens) within a vacuum-sealed enclosure, of a not pre-treated fibrous reinforcement of the type NICALON by aluminum.

EXAMPLE 6

The test described in Example 5 was repeated with a multidirectional preform made with silicon carbide based fibers (NICALON) in which the volume fraction of the fibers was of the order of 32 percent. After treatment with $K_2ZrF_6$ in aqueous solution, drying, pre-heating ofthe preform in the shell, casting in air (alloy AS7G06 at 750° C.) and cooling, it appeared that the said preform had been properly impregnated.

However, in order to obtain a good impregnation of this preform, less porous than that obtained in Example 5, pre-heating before casting had to be carried out at a higher temperature (of the order of 650° C.) in order that the alloy not solidify too rapidly upon contact with the shell and the preform and have time to penetrate into all the pores. Because of the excellent oxidation resistance of silicon carbide, this operation did not result in any substantial degradation of the reinforcing properties of the fibers while the same operation had to be conducted in a neutral atmosphere in the case of a preform of the same type but formed of carbon fibers.

EXAMPLE 7

Contrary to the preceding examples where the fibrous preform was made outside the mold, pre-treated by the fluorine containing agent, then introduced into the mold before casting, in this example. the fibrous reinforcement, in the form of a silicon carbide-based fibrous cloth (NICALON fibers) pre-treated with an aqueous solution of the $K_2ZrF_6$ agent, then dried, was draped, while still damp, against the walls of the mold and then layer upon layer in such a way as to practically fill the entire volume of the latter. After closing the shell, the mold and the fibrous reinforcement were brought to 120° C. to eliminate excess water and then to about 450° C. Impregnation with the AS7G06 alloy was effected in air under satisfactory conditions.

EXAMPLE 8

The procedure described in Example 5 was repeated, the preform consisting of a local reinforcement (40×20×10 mm) of a ceramic-ceramic type composite based on fibers and a matrix of silicon carbide (of the type of those fabricated by the Societe Europeenne de Propulsion under the trademark name of CERASEP). To insure good adherence at the moment of casting of the insert in the metal, the composite reinforcement had a substantial residual porosity on its inner surface (and on the contrary a practically non-existent porosity on its external surface). The composite insert, pre-treated with the $K_2ZrF_6$ agent, as indicated in Example 5, in such a way that its pores on its inner surface receive a fine layer of fluorine-containing product, was placed at the bottom of the mold and casting effected with the aid of the AS7G06 alloy at 750° C., after pre-heating to 500° to 600° C. and placement under partial vacuum.

After analysis it appeared that the alloy had perfectly penetrated into the pores of the insert to a depth of about 2 to 3 mm, thus insuring good anchoring of the composite insert into the metallic piece.

EXAMPLE 9

A carbon core comprising about 12,000 elementary strands dispersed with the aid of organic solvents and then dried, was continuously treated according to the method above indicated (FIGS. 3 and 4) with an aqueous practically saturated solution of $K_2ZrF_6$ and maintained at about 90° C., dried in a tubular electric oven to a temperature of about 300° C. then impregnated with an aluminum alloy of the AS7G type brought to a temperature of 750° to 800° C. The entire treatment was carried out in air, the speed of passage of the core being of the order of one meter per minute. Immediately upon leaving the metallic alloying bath, the product was calendered. It had then the shape of a thin ribbon (3×0.5 mm in cross-section) comprising a volume fraction of fibers approximating 40 percent. Micrographic observation of a polished section of the ribbon showed that the impregnation of the fibrous reinforcement by the metal had been homogeneous and that there was not a substantial quantity of residual porosities or a significant retention of fluorine containing agent.

A similar test, carried out on the same type of carbon core, but in which the pre-treatment with the $K_2ZrF_6$ solution had been eliminated failed, the liquid metal not having significantly penetrated within the core.

EXAMPLE 10

Example 9 was repeated by replacing the core of carbon fibers by a core of silicon carbide fibers (NICALON type fibers comprising about 200 elementary strands of ten to twelve ym in diameter). It was noted that the pre-treatment process with fluozirconate was equally effective in the case or silicon carbide based fibers and there was obtained after calendaring a composite wire of small diameter in which the volume fraction of the fibers was about 30 percent. Composite wires (or ribbons) of larger section can be prepared by using simultaneously several delivery bobbins in a single calendaring device.

As in the previous example, it was noted rhat by eliminating the pre-treatment with potassium fluozirconate, there was no substantial penetration of liquid metal within the core.

EXAMPLE 11

Example 9 was repeated by replacing the carbon fiber core by a fabric of silicon carbide fibers (NICALON fibers) in the form of a woven band about 60 mm wide. Said band after cleaning and drying (for example with the aid of organic solvents) underwent a pre-treatment similar to that described in Example 9 or 10, the speed, of passage however having been lowered to the vicinity of 50 cm per minute. Immediately upon leaving the bath of AS7G alloy, the composite band was made uniform in thickness by passage between two rolls. The product then had the shape of a thin strip 60 mm wide and about 0.3 mm thick with a volume fraction near 30 percent.

These strips were cut into 60 mm lengths, stacked between the platens of a heating press and compressed under vacuum to a temperature near the melting of the alloy. After cooling there was obtained a composite plaque measuring 60×60×5 mm. This example shows that semi-finished composite fibrous products of silicon-aluminum carbide can be continuously mad.e according to the process of the invention and then optionally transformed into more massive pieces following metallurgical shaping techniques known to one skilled in the art.

Similar results were obtained by replacing the silicon carbide-based fabric by carbon fabrics, the speed of passage being still lowered (up to about 10 cm a minute) in order to allow for a greater number of strands present in the carbon cores constituting the cloth.

We claim:

1. A process for making a composite material formed of a first carbon-based or carbide surface coated fibrous reinforcing component and a second component consisting of a light alloy matrix comprising:

treating such first component with a fluorine-containing agent in the form of a solution or a suspension, in a solvent, capable of wetting the fibers of said reinforcing component and optionally containing a fugitive binder; and later removing said solvent and binder, said solution being saturated or nearly saturated with potassium fluorozirconate which has been heated to a temperature ensuring in the solution a sufficient amount of fluorozirconate.

2. The process according to claim 1, wherein said pre-treatment of said fibrous reinforcing component by said fluorine-containing agent is carried out under an inert atmosphere, under reduced pressure or in air.

3. The process according to claim 1, wherein said first reinforcing component is used in the form of bulk short fibers, of a felt, of mats, of cores, cloth or multidirectional structures of fibers or of fibrous bars.

4. The process according to claim 1, comprising using said first reinforcing component in the form of a fibrous preform with a fluorine-containing agent, placing said pre-treated fibrous preform inside a mold, pre-heating the resulting assembly to a sufficient temperature depending particularly upon the porosity of the preform and which lies between 350° C. and the melting temperature of the alloy, and impregnating the said preform within said mold with a light alloy according to casting techniques.

5. The process according to claim 1, comprising using said first reinforcing component in the form of a fibrous preform, said fibrous preform being made within a mold, by draping said preform against the inner walls of the mold, then stacking layer upon layer until the entire volume of the mold is nearly full, with semi-finished fibrous products including mats or cloth, Previously pre-treated with a fluorine-containing agent drying the resulting assembly, the mold then being closed and pre-heated to a sufficient temperature depending upon the residual porosity of the preform and which lies between 350° C. and the melting temperature of the alloy, then impregnating said preform thus made within said mold with a light alloy according to casting techniques.

6. The process according to claim 5, wherein said reinforcing component is an insert of the ceramic-ceramic type, having at the level of the surfaces to be placed in contact with said alloy, an open residual porosity, in such a way as to effect, after impregnation by said liquid alloy, adhesion of said fibrous insert into the metallic matrix.

7. The process of claim 6, wherein said insert is a preform obtained by chemical vapor infiltration of silicon carbide within a stack of layers or silicon carbide fabric.

8. The process according to claim 5, wherein said fibrous preform occupies substantially all of said mold so as to form an integral reinforcement for said preforming or only part of said mold to form a local reinforcement for said preform.

9. The process according to claim 1, comprising
using said first reinforcing component continuously in the form of either of cores or of bands of carbon or carbide-based fibers or, based on a refractory material coated with carbide or carbon;
passing said first component under tension into a pre-treatment bath containing said fluorine-containing agent and wetting said first reinforcing component;
removing excess solvent by continuous passage into an oven,
impregnating said fibrous reinforcement thus pre-treated and dried with said second component by continuous passage in a vat containing said light alloy, maintained in the liquid state,
then shaping the resulting composite by passing between an extruder or between rollers immediately upon leaving said vat.

10. The process according to claim 9, wherein the speed of passage of said fibrous reinforcement is adjusted in such a way that said pre-treatment operation of impregnation by said fluorine-containing agent in solution or in suspension and elimination of the solvent leaves in the interstices and on the surface of said fibrous reinforcement a quantity just sufficient of fluorine-containing agent to promote wetting without thereby leading to the presence of inclusions and that the capillary ascent of the liquid metal into the pores and interstices of said first fibrous reinforcement is complete.

11. The process according to claim 10, wherein said speed of passage is comprised between a few tens of centimeters and a few meters per minute.

12. A process for making composite materials made from a first reinforcing fibrous component selected from the group of carbon-based fibers, carbide-based fibers, and fibers of refractory material coated with carbon or carbides, associated with a second component of a light alloy, comprising:
treating said first component in unitary form, in semi-finished condition, or, in preform condition, with a mineral fluorine-containing agent containing at least one complex fluoride of a transition element of the group of titanium, zirconium, hafnium, vanadium, niobium and tantalum, or of a metalloid element of the group of boron, silicon and aluminum, associated with an electropositive element of the group of alkaline metals, an alkaline earth metal, a rare earth metal, and ammonium, and impregnating the first said fibrous reinforcing component thus pre-treated with at least one light alloy used in liquid form;
said fluorine-containing agent being used in a solid state, in the form of a powder of fine granulometry, dispersed on the surface of said fibrous reinforcing component, and wherein the temperature of said fibrous reinforcing component is raised sufficiently to form a uniform and adhering crust of said agent around said fibrous reinforcing component.

13. Process for making composite materials made from a first reinforcing fibrous component selected from the group consisting of carbon-based fibers, carbide-based fibers, and fibers of refractory material coated with carbon or carbides, associated with a second component consisting of at least one light alloy, comprising:
treating said first component in unitary form, in semi-finished condition or in preformed condition, with a solid mineral fluorine-containing agent containing at least one complex fluoride of a transition element selected from the group consisting of titanium, zirconium, hafnium, vanadium, niobium and tantalum or of a metalloid element selected from the group consisting of boron, silicon, and aluminum, associated with a least one electropositive element of the group consisting of alkali metals, an alkaline earth metal, a rare earth metal and ammonium;
impregnating the said first fibrous reinforcing component thus pre-treated, with at least one of said light alloys, said light alloy being used in liquid form; and
raising the temperature of said fibrous component to form a crust of said agent around such component.

14. The process of claim 13, wherein said first fibrous component consists of silicon carbide.

15. The process of claim 13, wherein said light alloy consists of an aluminum alloy.

16. The process of claim 13, wherein said impregnating is carried out continuously.

17. The process of claim 13, wherein said impregnating is carried out in interrupted fashion.

18. The process according to claim 13, wherein said fluorine-containing agent is selected from the group consisting of potassium fluorotitanate, potassium fluorozirconate, a mixture of potassium fluorotitanate, $K_2TiF_6$ and of potassium fluorozirconate, $K_2ZrF_6$, and of potassium fluoroborate, $KBF_4$; said agent being capable of rendering said first component wettable by said second component and/or being dispersed ont he surface of said reinforcing component.

19. The process according to claim 18, wherein the two fluorine-containing species of said mixtures are present in substantially equal amounts.

20. The process according to claim 13, wherein to said fluorine-containing agent is added at least one halide of an alkali metal, alkaline earth metal or rare earth metal to lower the melting temperature of said agent and to influence chemical reactions intervening at the moment of pre-treating said reinforcing intervening at the moment of pre-treating said reinforcing fibrous component or the impregnation by said alloy.

21. The process according to claim 13, wherein said light alloy is a fusible aluminum alloy or an aluminum-silicon based alloy.

* * * * *